(12) United States Patent
Herring

(10) Patent No.: US 6,715,902 B1
(45) Date of Patent: Apr. 6, 2004

(54) LIGHT CONTROL APPARATUS

(76) Inventor: Joseph Herring, 5755 Kristin La., Beaumont, TX (US) 77713

( * ) Notice: Subject to any disclaimer, the term of this patent is extended or adjusted under 35 U.S.C. 154(b) by 0 days.

(21) Appl. No.: 10/194,863

(22) Filed: Jul. 12, 2002

(51) Int. Cl.[7] ............................................. F21V 23/04
(52) U.S. Cl. ..................... 362/295; 362/154; 362/394
(58) Field of Search ................................. 362/395, 130, 362/132, 134, 154, 253, 295, 362, 394, 411, 801

(56) References Cited

U.S. PATENT DOCUMENTS

| | | | |
|---|---|---|---|
| 4,304,447 A | 12/1981 | Ellwood et al. | |
| 4,420,084 A | 12/1983 | Whelan | |
| 4,485,916 A | 12/1984 | Krejcik | |
| 4,668,876 A | * 5/1987 | Skarman | ...................... 307/116 |
| 4,742,437 A | * 5/1988 | Downey | ...................... 362/130 |
| 5,023,522 A | * 6/1991 | Mansour | ...................... 362/394 |

* cited by examiner

Primary Examiner—Y My Quach Lee

(57) ABSTRACT

A light control apparatus for controlling the light level produced by a light fixture. The light control apparatus includes a housing comprising a perimeter wall. The perimeter wall defines an interior space of the housing. A control assembly is positioned in the interior space of the housing. The control assembly is designed for receiving a power plug of the light fixture. The control assembly is designed for being operationally coupled to a power supply whereby the control assembly controls power from the power supply to the light fixture when the control assembly is actuated by the user.

18 Claims, 5 Drawing Sheets

LIGHT CONTROL APPARATUS

BACKGROUND OF THE INVENTION

1. Field of the Invention

The present invention relates to concealed storage devices and more particularly pertains to a new light control apparatus for controlling the light level produced by a light fixture.

2. Description of the Prior Art

The use of concealed storage devices is known in the prior art. U.S. Pat. No. 4,485,916 describes a device for holding a storing precious objects. Another type of concealed storage devices is U.S. Pat. No. 4,304,447 having a shallow cabinet that is attached to a surface that resembles a framed picture when closed to conceal items stored in the cabinet. U.S. Pat. No. 4,420,084 has a device for holding jewelry.

While these devices fulfill their respective, particular objectives and requirements, the need remains for a device that has certain improved features to allow the user to connect and control a light fixture.

SUMMARY OF THE INVENTION

The present invention meets the needs presented above by providing a,control assembly in the housing to control power from a power supply to the light fixture.

Still yet another object of the present invention is to provide a new light control apparatus that provides access to the interior space of the housing to permit items to be stored in the interior space of the housing.

To this end, the present invention generally comprises a housing comprising a perimeter wall. The perimeter wall defines an interior space of the housing. A control assembly is positioned in the interior space of the housing. The control assembly is designed for receiving a power plug of the light fixture. The control assembly is designed for being operationally coupled to a power supply whereby the control assembly controls power from the power supply to the light fixture when the control assembly is actuated by the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
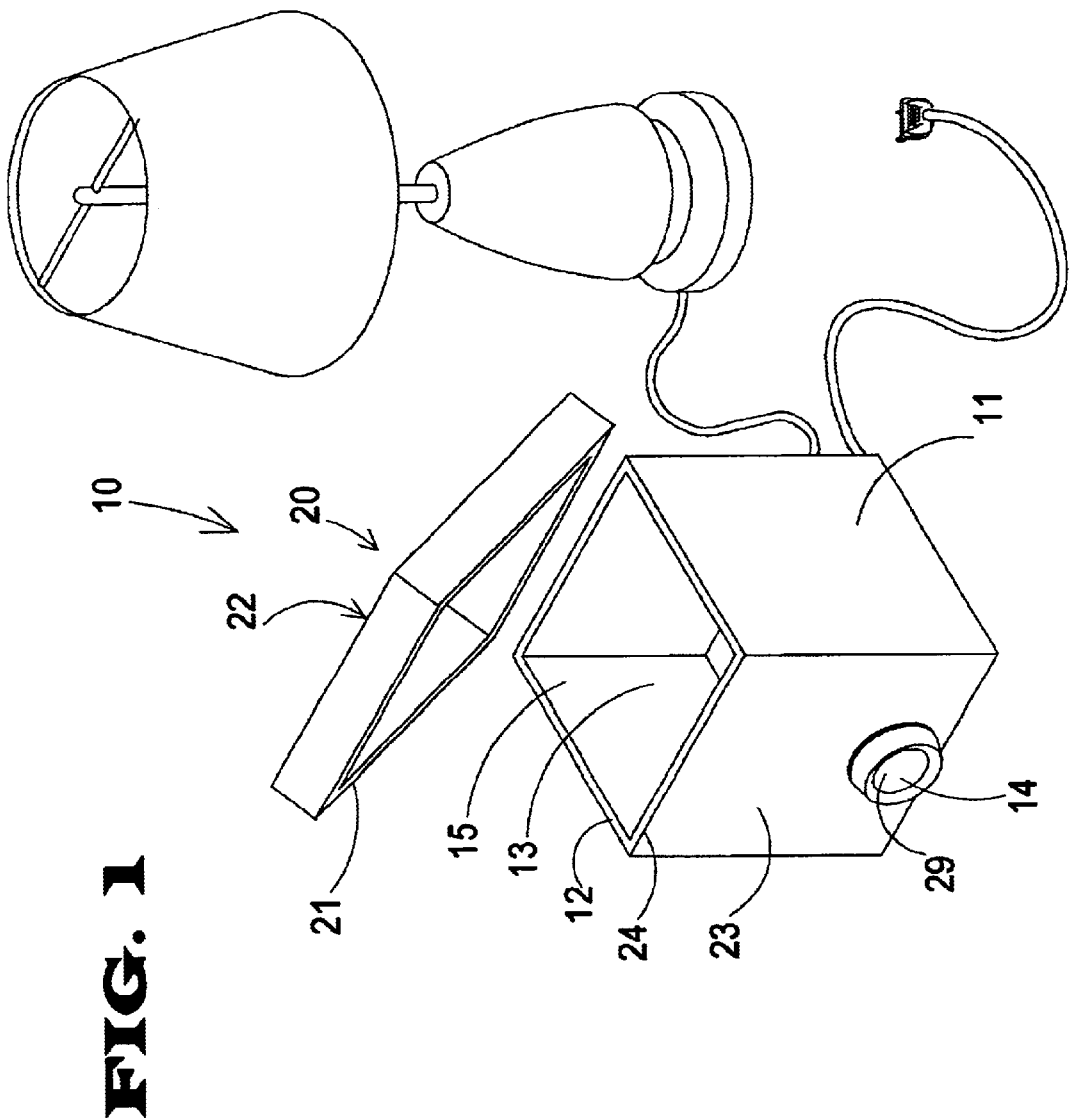
FIG. 1 is a front perspective view of a new light control apparatus according to the present invention shown in use.
Figure 2:
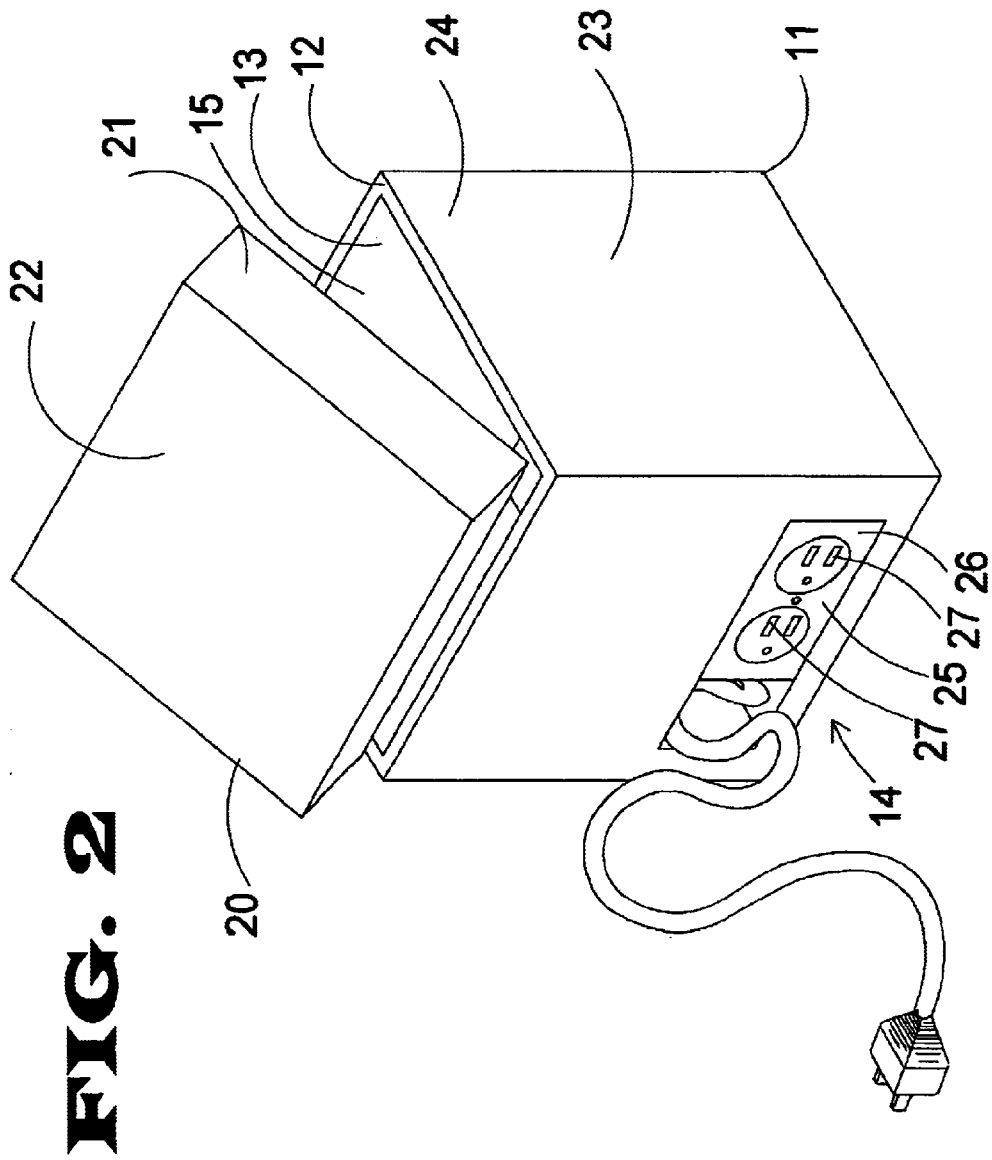
FIG. 2 is a rear perspective view of the present invention.
Figure 3:
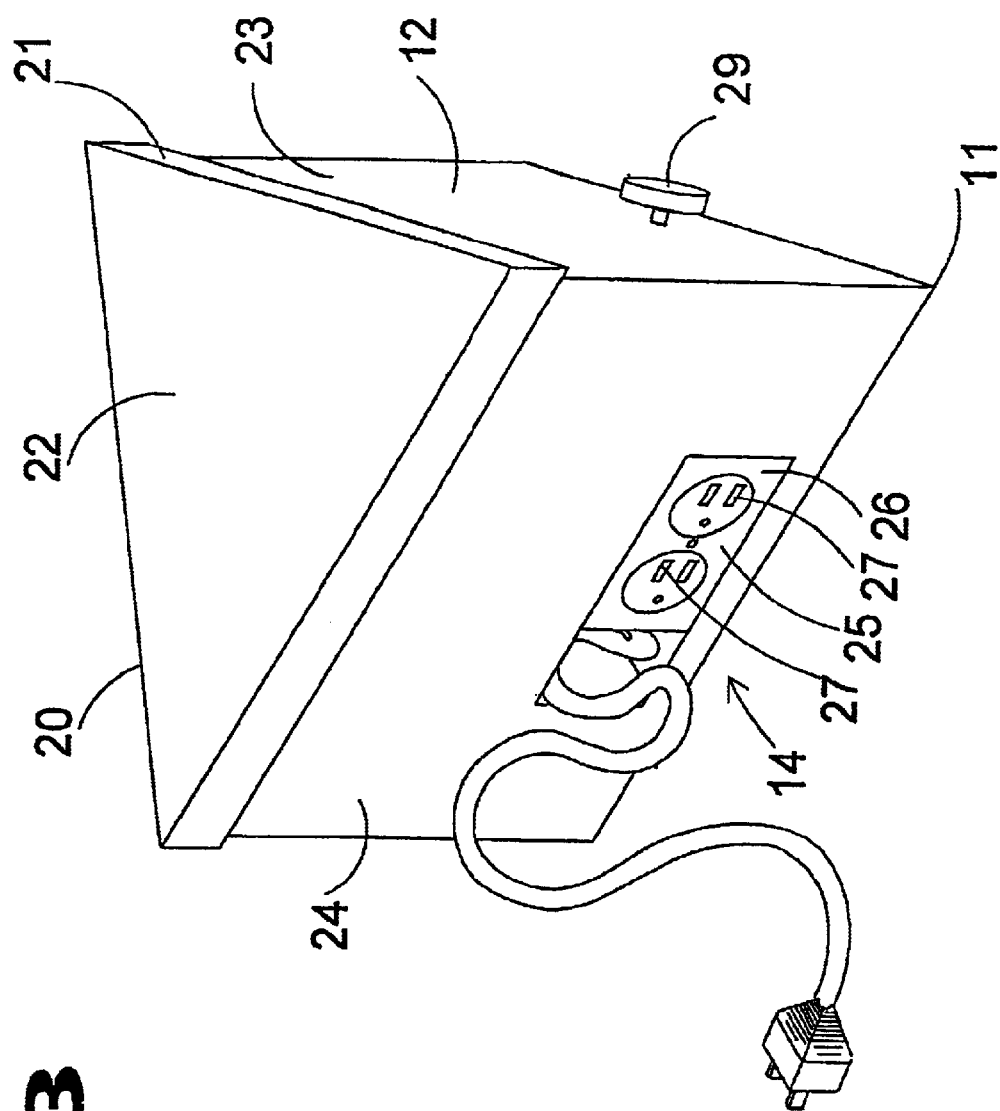
FIG. 3 is a perspective view of an alternate embodiment of the housing of the present invention.

With reference now to the drawings, and in particular to FIGS. 1 through 5 thereof, a new light control apparatus embodying the principles and concepts of the present invention and generally designated by the reference numeral 10 will be described.

As best illustrated in FIGS. 1 through 5, the light control apparatus 10 generally comprises a housing 11 comprising a perimeter wall 12. The perimeter wall 12 defines an interior space 13 of the housing 11.

A control assembly 14 is positioned in the interior space 13 of the housing 11. The control assembly 14 is designed for receiving a power plug of the light fixture. The control assembly 14 is designed for being operationally coupled to a power supply whereby the control assembly 14 controls power from the power supply to the light fixture when the control assembly 14 is actuated by the user.

The interior space 13 of the housing 11 comprises an open end 15. The open end 15 is positioned opposite the control assembly 14 whereby the open end 15 is designed for permitting insertion of objects into the interior space 13 of the housing 11 by the user.

Figure 4:
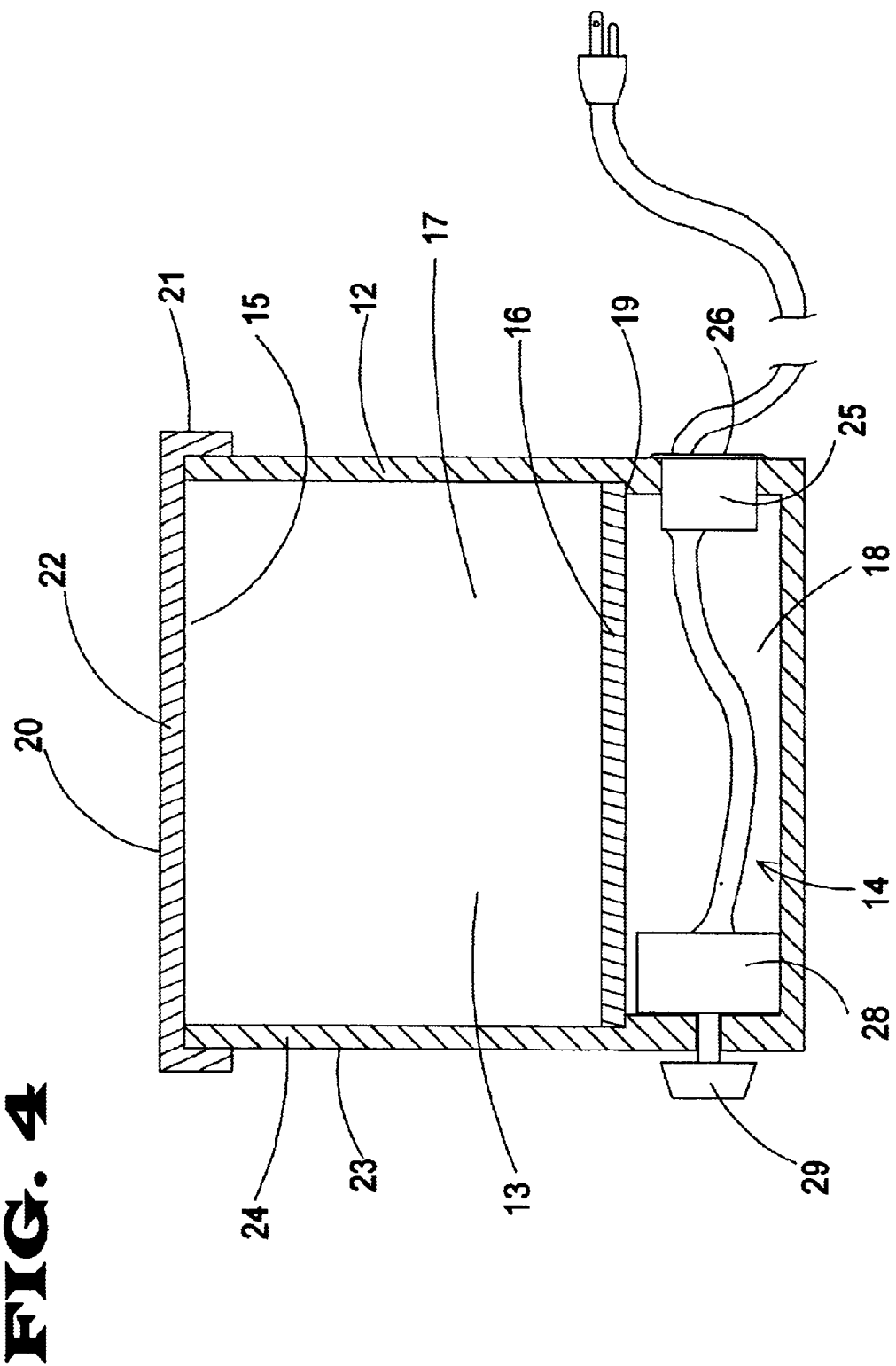
FIG. 4 is a cross-sectional view of the present invention.
Figure 5:
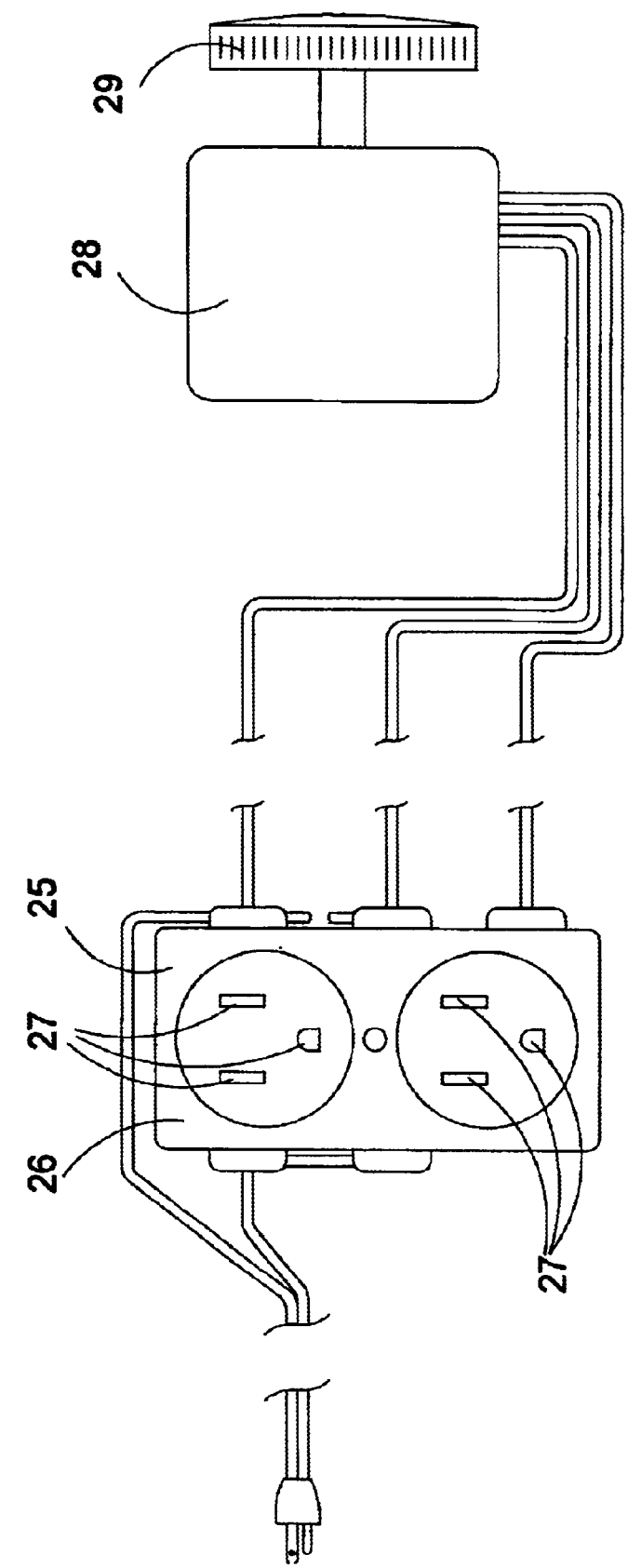
FIG. 5 is a schematic view of the control assembly of the present invention.

As shown in FIG. 4, a plate member 16 is insertable into the interior space 13 of the housing 11 through the open end 15 of the interior space 13. The plate member 16 separates the interior pace into an upper space 17 and lower space 18 when the plate member 16 is positioned in the interior space 13 of the housing 11. The upper space 17 is designed for receiving articles placed in the upper space 17 through the open end 15 of the interior space 13 by the user.

The housing 11 comprises a lip 19. The lip 19 is positioned in the interior space 13 of the housing 11. The lip 19 supports the plate member 16 when the plate member 16 is positioned in the interior space 13 of the housing 11. The control assembly 14 is positioned in the lower space 18 of the interior space 13.

A lid member 20 is selectively couplable to the housing 11. The lid member 20 closes the open end 15 of the interior space 13 of the housing 11 when the lid member 20 is coupled to the housing 11. The lid member 20 comprises a peripheral wall 21. The peripheral wall 21 downwardly extends from a perimeter of a top plate 22 of the lid member 20. The peripheral wall 21 of the lid member 20 abuts against an exterior surface 23 of the perimeter wall 12 of the housing 11 whereby the peripheral wall 21 extends around a top end 24 of the housing 11 the lid member 20 coupled to the housing 11. The top plate 22 of the lid member 20 is positioned over the open end 15 of the interior space 13 of the housing 11 when the lid member 20 is coupled to the housing 11.

The control assembly 14 comprises an outlet member 25. The outlet member 25 extends through the perimeter wall 12 of the housing 11 whereby a face 26 of the outlet member 25 is aligned with the exterior surface 23 of the perimeter wall 12. The outlet member 25 comprises a plurality of apertures 27 extending into the outlet member 25. The apertures 27 are designed for receiving prongs of the power plug of the light fixture. The outlet member 25 is designed for being operationally coupled to the power supply whereby the outlet member 25 is for transferring power from the power supply to the light fixture.

The control assembly 14 comprises a control means 28 for controlling the amount of power transferred between the power supply and the outlet member 25. The control assembly 14 is operationally coupled between the outlet member 25 and the power supply. The control assembly 14 is designed for being selectively actuated by the user whereby the control means 28 permits the user to permit more power to be transferred to the light fixture for increasing the amount of light produced by the light fixture. The control assembly 14 is designed for being selectively actuated by the user to restrict the amount of power transferred to the light fixture for diminishing the amount of light is produced by the light fixture.

The control assembly 14 comprises a knob member 29. The knob member 29 is operationally coupled to the control means 28. The knob member 29 extending through the perimeter wall 12 of the housing 11 whereby the knob member 29 is designed for being actuated by the user when the user wishes to control the control means 28.

The housing 11 has a substantially square cross-section taken perpendicular to a longitudinal axis of the housing 11. In the alternative, the housing 11 has a substantially triangular cross-section taken perpendicular to a longitudinal axis of the housing 11.

In use, the user connects the control assembly 14 to the power supply. The user then connects the power plug from the light fixture the outlet member 25 of the control assembly 14. The knob member 29 can then be actuated to dim or brighten the light emitted form the light fixture. The lid member 20 can then be removed from the housing 11 to allow the user to place items, such as loose change or a watch, into the interior space 13 of the housing 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A light control apparatus for controlling a light fixture, the light control apparatus comprising:
    a housing comprising a perimeter wall, said perimeter wall defining an interior space of said housing;
    a control assembly being positioned in said interior space of said housing, said control assembly being adapted for receiving a power plug of the light fixture, said control assembly being adapted for being operationally coupled to a power supply such that said control assembly controls power from the power supply to the light fixture when said control assembly is actuated by the user;
    said interior space of said housing comprising an open end, said open end being positioned opposite said control assembly such that said open end is adapted for permitting insertion of objects into said interior space of said housing be the user; and
    a plate member being insertable into said interior space of said housing through said open end of said interior space, said plate member separating said interior space into an upper space and lower space when said plate member is positioned in said interior space of the housing, said upper space being adapted for receiving articles placed in said upper space through said open end of said interior space by the user.

2. The light control apparatus as set forth in claim 1, further comprising:
    said housing comprising a lip, said lip being positioned in said interior space of said housing, said lip supporting said plate member when said plate member is positioned in said interior space of said housing, said control assembly being positioned in said lower space of said interior space.

3. The light control apparatus as set forth in claim 1, further comprising:
    a lid member being selectively couplable to said housing, said lid member closing said open end of said interior space of said housing when said lid member is coupled to said housing.

4. The light control apparatus as set forth in claim 3, further comprising:
    said lid member comprising a peripheral wall, said peripheral wall downwardly extending from a perimeter of a top plate of said lid member, said peripheral wall of said lid member abutting against an exterior surface of said perimeter wall of said housing such that said peripheral wall extends around a top end of said housing when said lid member coupled to said housing, said top plate of said lid member being positioned over said open end of said interior space of said housing when said lid member is coupled to said housing.

5. The light control apparatus as set forth in claim 1, wherein said housing has a substantially square cross-section taken perpendicular to a longitudinal axis of said housing.

6. The light control apparatus as set forth in claim 1, wherein said housing has a substantially triangular cross-section taken perpendicular to a longitudinal axis of said housing.

7. The light control apparatus as set forth in claim 1, further comprising:
    said control assembly comprising an outlet member, said outlet member extending through said perimeter wall of said housing such that a face of said outlet member is aligned with an exterior surface of said perimeter wall, said outlet member comprising a plurality of apertures extending into said outlet member, said apertures being adapted for receiving prongs of the power plug of the light fixture, said outlet member being adapted for being operationally coupled to the power supply such that said outlet member is for transferring power from the power supply to the light fixture.

8. The light control apparatus as set forth in claim 1, further comprising:
    said control assembly comprising a control means for controlling the amount of power transferred between the power supply and said outlet member, said control assembly being operationally coupled between said outlet member and the power supply, said control assembly being adapted for being selectively actuated by the user such that said control means permits the user to permit more power to be transferred to the light fixture for increasing the amount of light produced by the light fixture, said control assembly being adapted for being selectively actuated by the user to restrict the amount of power transferred to the light fixture for diminishing the amount of light being produced by the light fixture.

9. The light control apparatus as set forth in claim 8, further comprising:

said control assembly comprising a knob member, said knob member being operationally coupled to said control means, said knob member extending through said perimeter wall of said housing such that said knob member is adapted for being actuated by the user when the user wishes to control said control means.

10. A light control apparatus for controlling a light fixture, the light control apparatus comprising:

a housing comprising a perimeter wall, said perimeter wall defining an interior space of said housing;

a control assembly being positioned in said interior space of said housing, said control assembly being adapted for receiving a power plug of the light fixture, said control assembly being adapted for being operationally coupled to a power supply such that said control assembly controls power from the power supply to the light fixture when said control assembly is actuated by the user;

said interior space of said housing comprising an open end, said open end being positioned opposite said control assembly such that said open end is adapted for permitting insertion of objects into said interior, space of said housing by the user;

a plate member being insertable into said interior space of said housing through said open end of said interior space, said plate member separating said interior space into an upper space and lower space when said plate member is positioned in said interior space of the housing, said upper space being adapted for receiving articles placed in said upper space through said open end of said interior space by the user;

said housing comprising a lip, said lip being positioned in said interior space of said housing, said lip supporting said plate member when said plate member is positioned in said interior space of said housing, said control assembly being positioned in said lower space of said interior space;

a lid member being selectively couplable to said housing, said lid member closing said open end of said interior space of said housing when said lid member is coupled to said housing;

said lid member comprising a peripheral wall, said peripheral wall downwardly extending from a perimeter of a top plate of said lid member, said peripheral wall of said lid member abutting against an exterior surface of said perimeter wall of said housing such that said peripheral wall extends around a top end of said housing when said lid member coupled to said housing, said top plate of said lid member being positioned over said open end of said interior space of said housing when said lid member is coupled to said housing;

said control assembly comprising an outlet member, said outlet member extending through said perimeter wall of said housing such that a face of said outlet member is aligned with said exterior surface of said perimeter wall, said outlet member comprising a plurality of apertures extending into said outlet member, said apertures being adapted for receiving prongs of the power plug of the light fixture, said outlet member being adapted for being operationally coupled to the power supply such that said outlet member is for transferring power from the power supply to the light fixture;

said control assembly comprising a control means for controlling the amount of power transferred between the power supply and said outlet member, said control assembly being operationally coupled between said outlet member and the power supply, said control assembly being adapted for being selectively actuated by the user such that said control means permits the user to permit more power to be transferred to the light fixture for increasing the amount of light produced by the light fixture, said control assembly being adapted for being selectively actuated by the user to restrict the amount of power transferred to the light fixture for diminishing the amount of light being produced by the light fixture; and said control assembly comprising a knob member, said knob member being operationally coupled to said control means, said knob member extending through said perimeter wall of said housing such that said knob member is adapted for being actuated by the user when the user wishes to control said control means.

11. The light control apparatus as set forth in claim 10, wherein said housing has a substantially square cross-section taken perpendicular to a longitudinal axis of said housing.

12. The light control apparatus as set forth in claim 10, wherein said housing has a substantially triangular cross-section taken perpendicular to a longitudinal axis of said housing.

13. A light control apparatus for controlling a light fixture, the light control apparatus comprising:

a housing comprising a perimeter wall, said perimeter wall defining an interior space of said housing;

a control assembly being positioned in said interior space of said housing, said control assembly being adapted for receiving a power plug of the light fixture, said control assembly being adapted for being operationally coupled to a power supply such that said control assembly controls power from the power supply to the light fixture when said control assembly is actuated by the user;

said interior space of said housing comprising an open end, said open end being positioned opposite said control assembly such that said open end is adapted for permitting insertion of objects into said interior space of said housing by the user;

a lid member being selectively couplable to said housing, said lid member closing said open end of said interior space of said housing when said lid member is coupled to said housing; and said lid member comprising a peripheral wall, said peripheral wall downwardly extending from a perimeter of a top plate of said lid member, said peripheral wall of said lid member abutting against an exterior surface of said perimeter wall of said housing such that said peripheral wall extends around a top end of said housing when said lid member coupled to said housing, said top plate of said lid member being positioned over said open end of said interior space of said housing when said lid member is coupled to said housing.

14. The light control apparatus as set forth in claim 13, wherein said housing has a substantially square cross-section taken perpendicular to a longitudinal axis of said housing.

15. The light control apparatus as set forth in claim 13, wherein said housing has a substantially triangular cross-section taken perpendicular to a longitudinal axis of said housing.

16. The light control apparatus as set forth in claim 13, further comprising:

said control assembly comprising an outlet member, said outlet member extending through said perimeter wall of said housing such that a face of said outlet member is aligned with an exterior surface of said perimeter wall, said outlet member comprising a plurality of apertures extending into said outlet member, said apertures being adapted for receiving prongs of the power plug of the light fixture, said outlet member being adapted for being operationally coupled to the power supply such that said outlet member is for transferring power from the power supply to the light fixture.

17. The light control apparatus as set forth in claim 16, further comprising:

said control assembly comprising a control means for controlling the amount of power transferred between the power supply and said outlet member, said control assembly being operationally coupled between said outlet member and the power supply, said control assembly being adapted for being selectively actuated by the user such that said control means permits the user to permit more power to be transferred to the light fixture for increasing the amount of light produced by the light fixture, said control assembly being adapted for being selectively actuated by the user to restrict the amount of power transferred to the light fixture for diminishing the amount of light being produced by the light fixture.

18. The light control apparatus as set forth in claim 17, further comprising:

said control assembly comprising a knob member, said knob member being operationally coupled to said control means, said knob member extending through said perimeter wall of said housing such that said knob member is adapted for being actuated by the user when the user wishes to control said control means.

* * * * *